United States Patent [19]
Barigelli

[11] Patent Number: 5,099,909
[45] Date of Patent: Mar. 31, 1992

[54] SURFACE TYPE HEAT EXCHANGER FOR HEATING THE WATER FEEDING THE WINDSHIELD WASHER OF AUTOMOBILES AND FOR HEATING THE DIESEL OIL

[76] Inventor: Giuseppe Barigelli, Via Rossini, 95, Villastrada Di Cingoli (MC), Italy, 62011

[21] Appl. No.: 708,890

[22] Filed: May 31, 1991

[51] Int. Cl.$^5$ .................. F28D 7/02; B60S 1/46; B60S 1/48
[52] U.S. Cl. ........................... 165/41; 165/52; 165/140; 165/163; 165/51; 239/129; 239/130; 123/557
[58] Field of Search ............ 165/163, 51, 52, 140, 165/41; 123/557; 239/129, 130

[56] References Cited

U.S. PATENT DOCUMENTS

| | | | |
|---|---|---|---|
| 2,061,600 | 11/1936 | Spencer | 123/557 |
| 2,492,407 | 12/1949 | Tomany | 165/163 |
| 2,566,976 | 9/1951 | Bernstrom | 165/163 |
| 3,070,975 | 1/1953 | Cornelius | 165/163 |
| 3,253,647 | 5/1966 | DeShaies | 165/163 |
| 3,404,731 | 10/1968 | Cushman | 165/163 |
| 3,499,484 | 3/1970 | Lanzuni | 165/163 |
| 4,099,501 | 7/1978 | Fairbanks et al. | 123/557 |
| 4,354,548 | 10/1982 | Carlsson | 165/41 |
| 4,700,047 | 10/1987 | Grossett et al. | 165/163 |
| 4,862,951 | 9/1989 | Müller et al. | 165/163 |
| 4,865,124 | 9/1989 | Dempsey | 165/163 |
| 4,895,203 | 1/1990 | McLaren | 165/163 |

FOREIGN PATENT DOCUMENTS 0355246  2/1990  European Pat. Off. ............ 123/557

*Primary Examiner*—John K. Ford
*Attorney, Agent, or Firm*—Leonard Bloom

[57] ABSTRACT

A heat exchanger for heating washer fluid supplied to motor vehicle windshield washer nozzles simultaneously with diesel oil supplied to the diesel engine of the vehicle is disclosed. Engine coolant heats a tank containing separate coils through which the washer fluid and diesel oil circulates.

1 Claim, 1 Drawing Sheet

SURFACE TYPE HEAT EXCHANGER FOR HEATING THE WATER FEEDING THE WINDSHIELD WASHER OF AUTOMOBILES AND FOR HEATING THE DIESEL OIL

DESCRIPTION

This patent application is for a surface type heat exchanger for heating water to feed motor vehicle windshield washer nozzles and for heating Diesel oil drawn from the tank before the oil crosses the filter.

The first problem this device is designed to solve concerns effectively cleaning the outside of the front glass of vehicles. This is essential for perfect visibility and driving safety.

Today all modern automobiles are equipped with a device that sprays water at ambient temperature on the windshield; the wipers are then switched on and the mud, dirt and dust are wiped perfectly away.

In at least two cases, however, this combined action fails to give the desired results in that the outside of the glass is not perfectly cleaned. This occurs when, naturally during the winter, ice forms on the glass, or when, on the road small insects and bugs are spattered against the glass and leave as oily film.

In both cases, hot water must be used to remove the ice or film to make the windshield perfectly clear.

Until today this could only be done with the vehicle stopped and getting hot water and a cloth to clean the glass since no automobile was equipped with a hot water spray system.

Actually some attempts have been made but they have not been very successful and have consisted mainly of inserting in the water container an electric heating element to raise the temperature of the windshield spray water.

But this system, besides the difficulty of its installation, also draws energy from the battery and can cause problems with the electric system in the car.

Our device, instead, proposes heating the windshield washer water in an extremely practical, functional and above all economic manner without interfering even minimally with the vehicle's technical characteristics.

It uses a surface heat exchanger to be applied to the tube which form the engine takes the hot water to the cooling radiator or to the tube which from the engine takes the hot water to the small radiator of the car air conditioning system.

The second problem our device solves concerns preheating the Diesel oil before it enters the filter and then the engine combution chamber so that the temperature is such as to assure continuous fluidification to guarantee elimination of solid crystals of paraffin or tar which are among the principal causes of smoking, an indication of poor combustion in Diesel engines which diminishes engine performance.

Considering that the amount of Diesel oil let into the cylinder by the injection pump is barely 2-3% of the amount of Diesel oil picked up by the tank in which the remaining quantity, or 97-98%, is recycled, it immediately becomes clear how continuous circulation of the hot Diesel oil is obtained between the injection pumps and tank and the danger of impurities building up in the hydraulic circuit is eliminated.

According to our device the surface exchanger consists of a rather stubby cylindrically shaped tank with slightly convex ends inside which are housed two copper coils: one is for the Diesel oil and the other for the windshield wiper washer water.

The inlets and outlets of each coil issue from the side of the above tank and are diametrically opposite the two openings of the other coil.

At the center of the two convex ends of the above exchanger are installed two conventional type fittings through which the hot water coming from the radiator of the engine coolant system enters and exits from the heat exchanger, yielding its heat to the Diesel oil and windshield wiper washer water, respectively, inside the two above-described coils.

For greater clarity, the description of the device is continued with reference to the enclosed drawings which serve solely for purposes of illustration:

Figure 1:
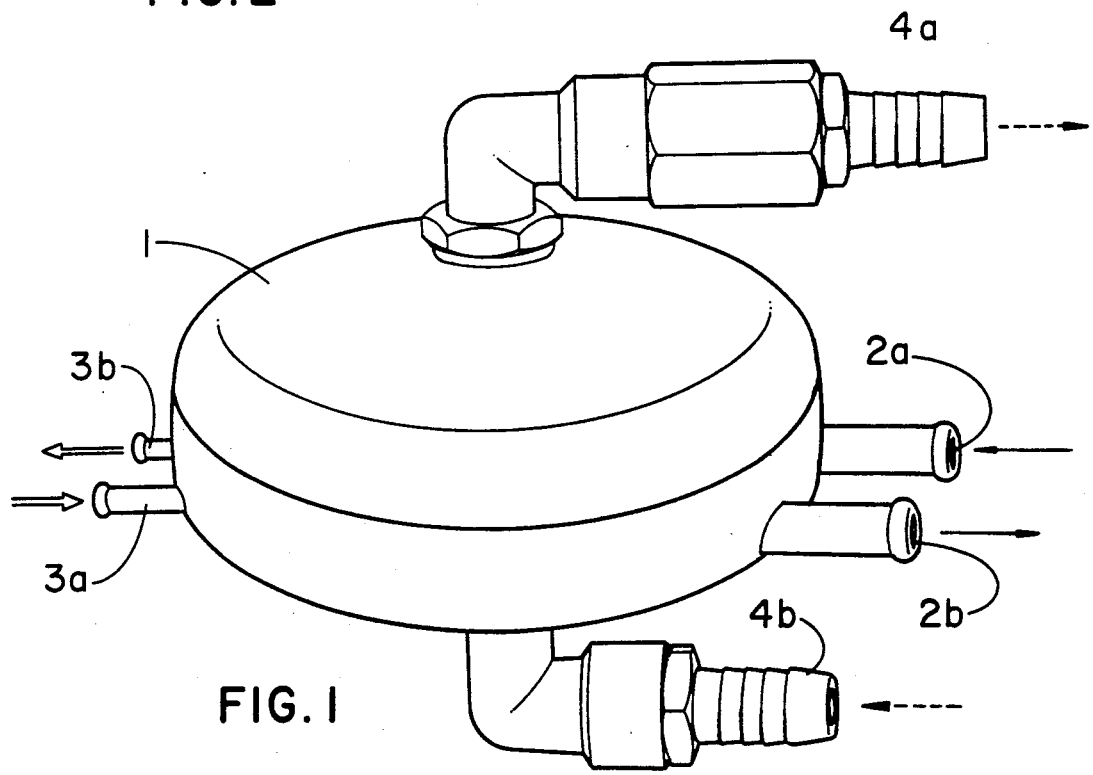
FIG. 1 illustrates the exchanger in perspective.

With reference to FIG. 1, the surface heat exchanger according to the device includes two copper coils: the one with the larger diameter is for the Diesel oil and is wound in several tight turns enclosed in a tank (1) constructed of two circular half shells in a basin shape that fit together and are welded.

The input and output nozzles (2a) and (2b) of one of the two coils issue from the side wall of the tank (1): they are close to each other and parallel and diametrically opposite nozzles (3a) and (3b) of the other coil.

The hot water for heating the Diesel oil and the windshield washer water flows, respectively, in the two above coils: the engine coolant can enter tank (1) and exit through two nozzles (4a and 4b) which are of standard shape and installed at the centre of the top and bottom ends of the two above-described half shells.

Figure 2:
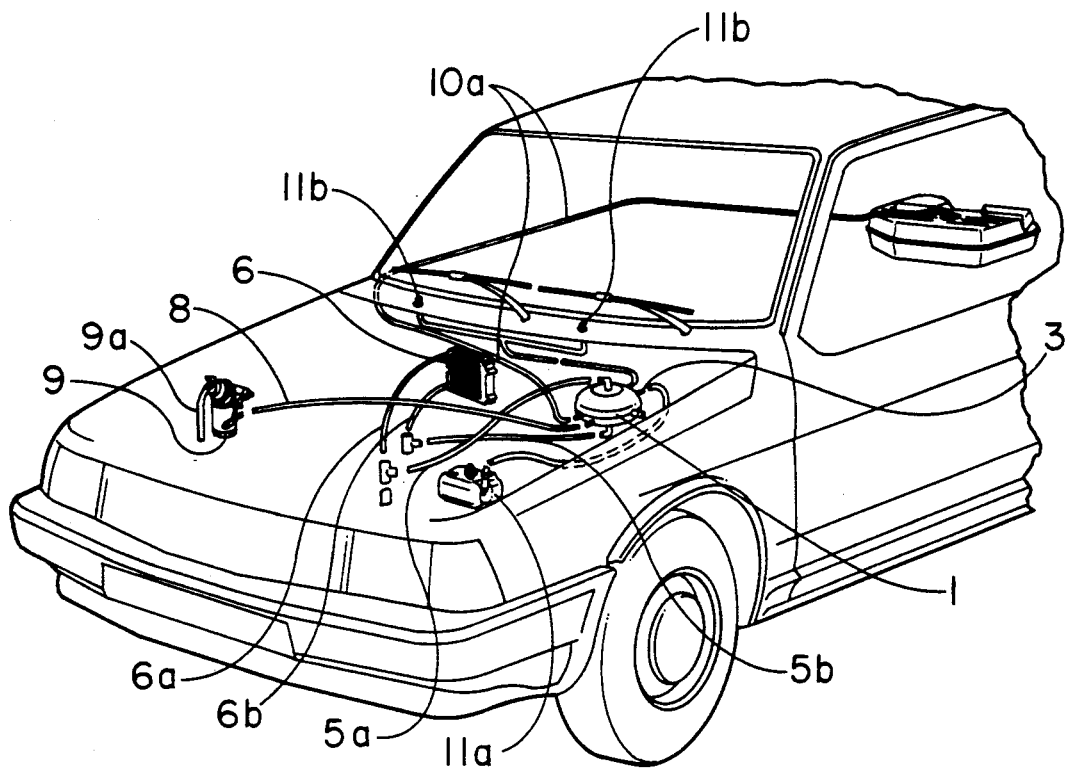
FIG. 2 illustrates in a schematic drawing how the exchanger according to the device is installed inside the engine compartment of an automobile equipped with Diesel engine.

As shown in FIG. 2, installation of the exchanger described herein in the engine compartment is quite simple.

First of all, using the flexible connecting pipes (5a) and (5b), join nozzles 4a and 4b to the feed and exhaust pipes (6a and 6b) of the internal feed system radiator 6.

To connect the two coils, the larger diameter coil is inserted along the Diesel oil circuit and the smaller diameter coil along the windshield washer water circuit.

In FIG. 2, number (8) shows the flexible pipe through which the Diesel oil comes from the heat exchanger to the filter (9) from where it is sent, through pipe 9a, to the injection pump.

The Diesel oil goes to the heat exchanger from fuel tank through pipe (10a).

As for the windshield wiper water circuit, the flexible pipe (11) through which the water from tank (11a) goes to the spray nozzles (11b) is cut to be fit on the two input and output nozzles of the small diameter coil enclosed in the shell (1).

I claim:

1. Surface type heat exchanger for heating washer fluid feeding the windshield washer system of a diesel engine powered vehicle and for heating diesel oil supplied to the diesel engine comprising:
    two copper coils, a larger diameter one connected to a diesel oil supply and wound in several close circular spires enclosed in a tank (1),
    said tank (1) consisting of two circular half shells in basin form that are fit together and welded, input and output nozzles (2a and 2b) for said diesel oil coil issue from the tank (1) and are formed close to each other and parallel, diametrically opposed to input and output nozzles (3a and 3b) of said other coil through which washer fluid is circulated, said tank having inlet and outlet nozzles (4a and 4b) connected for flow of hot engine coolant and installed at the center of the top and bottom ends of said two half shells.

* * * * *